United States Patent
Cavalli et al.

(10) Patent No.: US 8,023,986 B2
(45) Date of Patent: Sep. 20, 2011

(54) MOBILE TERMINAL ENTRY BASED ON POWER CONTROL WITHIN MAXIMUM ADMITTED POWER RANGE

(75) Inventors: Giulio Cavalli, Milan (IT); Giovanni Maggi, Milan (IT)

(73) Assignee: Nokia Siemens Networks S.p.A., Milan (IT)

( * ) Notice: Subject to any disclaimer, the term of this patent is extended or adjusted under 35 U.S.C. 154(b) by 838 days.

(21) Appl. No.: 12/008,242

(22) Filed: Jan. 9, 2008

(65) Prior Publication Data
US 2008/0182610 A1 Jul. 31, 2008

(30) Foreign Application Priority Data
Jan. 12, 2007 (EP) .................................. 07425009

(51) Int. Cl.
*H04W 52/30* (2009.01)
(52) U.S. Cl. ...................................................... 455/522
(58) Field of Classification Search .................. None
See application file for complete search history.

(56) References Cited

U.S. PATENT DOCUMENTS

| | | | |
|---|---|---|---|
| 6,941,152 B2 * | 9/2005 | Proctor et al. | 455/522 |
| 2003/0078010 A1 * | 4/2003 | Davis | 455/522 X |
| 2004/0147274 A1 * | 7/2004 | Khawand et al. | 455/522 |
| 2005/0164742 A1 * | 7/2005 | Rajkotia | 455/522 X |
| 2006/0286994 A1 * | 12/2006 | Kwak et al. | 455/522 |
| 2008/0254819 A1 * | 10/2008 | Niwano et al. | 455/522 |

* cited by examiner

*Primary Examiner* — Philip Sobutka

(57) ABSTRACT

To perform a network entry of a terminal to a wireless network including a base station, wherein the terminal has a maximum power capability, at least one attempt is performed by the terminal to establish communication with the base station with a power level within a terminal admitted power range. The terminal admitted power range extends up to the maximum power capability of the terminal. In the absence of a response from the base station, one or more repeated attempts are performed with power levels gradually increased over the initial power level within a terminal admitted power range. The admitted power range extends up to the maximum power capability of the terminal.

17 Claims, 3 Drawing Sheets

MOBILE TERMINAL ENTRY BASED ON POWER CONTROL WITHIN MAXIMUM ADMITTED POWER RANGE

CROSS-REFERENCE TO RELATED APPLICATIONS

The present application claims priority to European Patent Application No. 07425009.3, filed on Jan. 12, 2007, which is incorporated herein by reference.

BACKGROUND OF THE INVENTION

The invention relates to techniques for controlling entry of terminals in wireless communication networks such as mobile communication networks.

Network Entry is the procedure by means of which a terminal (mobile or fixed) "enters" a wireless communication network including any number of base stations. Basic telecommunication standards such as 802.16-2004 and 802.16-2005 specify the steps necessary to complete this task, i.e., Network Entry. One of the key factors that come into play in the related procedure is the maximum transmission power allowed for a terminal entering the network.

During normal operation, that is, once the terminal has already entered the network, the power level of the terminal is adjusted as a function of measurements performed at the base station. Conversely, during the initial steps of the Network Entry procedure, e.g., Initial Ranging, the maximum allowed power is determined by the terminal itself. For instance, the terminal seeking entry to the network may calculate a value for its maximum allowed power $P_{TX\_IR\_MAX}$ on the basis of the following relationship:

$$P_{TX\_IR\_MAX} = EIRxP_{IR,max} + BS\_EIRP - RSS + (G_{Rx\_SS} - G_{Tx\_SS})$$

where:
$EIRxP_{IR,max}$ is the maximum equivalent isotropic received power at the terminal, that is the effective power measured at the antenna receiver,
RSS is the received signal strength at the antenna output,
BS_EIRP is the equivalent isotropic radiated power of the base station, that is the effective power measured at the antenna transmitter, and
$G_{Rx\_SS}$ and $G_{Tx\_SS}$ are the receiver and terminal antenna gain at the terminal.

The terminal will start the network entry procedure by using a given power level, e.g., the level $P_{TX\_IR\_MAX}$ calculated as indicated in the foregoing or, e.g., in case this value cannot be calculated, a minimum reference level (which may be lower than $P_{TX\_IR\_MAX}$).

Typically, during the Network Entry procedure, the terminal attempts to establish communication with the base station expected to serve it until it receives a response from the base station. In so doing, the terminal starts from a given initial power level, and, in case no response is received from the base station, the terminal gradually increases its transmission power up to a maximum value, and possibly "wraps back" to the initial value, restarting the procedure from the beginning, if no response is received from the base station.

Typically, after a given number of repeated attempts without being able to establish communication (i.e., without network entry being achieved) a back-off procedure is initiated: since a limited number of entries is available, the terminal generates a random number in order to determine the entry to be used for network entry. In case of failure, a new number is tried up to a maximum number of retry attempts. Once this maximum number is reached, the channel is "marked" as unusable and the terminal looks for a new channel where the Network Entry procedure is re-started from the beginning.

SUMMARY OF THE INVENTION

Despite the intrinsic simplicity of the procedure outlined above, a key issue arises in properly defining the "maximum value" of the power allowed for a terminal during the Network Entry procedure, that is the upper bound of the terminal admitted power range over which the terminal is allowed to set its power during the network entry procedure.

In fact, in the case of TDD (Time Domain Division) systems, terminals that are very close to the base station may end up using an unnecessarily high transmission power, possibly "spoiling" (i.e., causing disturbance to) signals received from other terminals. Limiting the power level used during the network entry procedure to a maximum value such as, e.g., $P_{TX\_IR\_MAX}$ may thus be advantageous in that case.

However, taking, e.g., $P_{TX\_IR\_MAX}$ as the maximum power value admitted may lead a terminal being finally excluded from entering the network due to its inability to receive any response from the base station simply because that terminal was prevented from raising its power to a level (in excess of $P_{TX\_IR\_MAX}$) high enough to enable the base station to "hear" it. This is particularly the case for terminals that are located at the edge of a cell.

On the one hand, the formula for $P_{TX\_IR\_MAX}$ given in the foregoing may be viewed to take into account the fact that a terminal can be both close to the base station or at the edge of the cell, so that no limitations are imposed on the terminal. In fact, current experience shows that a maximum value corresponding to the value $P_{TX\_IR\_MAX}$ calculated as specified in the foregoing (i.e., on the basis of parameters provided by the base station which are the results of theoretical assumptions) is generally satisfactory for systems such as TDD systems.

On the other hand, in other systems such as, e.g., FDD (Frequency Domain Division) systems, where "downlink" and "uplink" channels may be asymmetric, the value given by $P_{TX_{IR}\_MAX}$, which is based on theoretical assumptions plus measurements on the downlink channel, the results may be unsatisfactory and lead to the disadvantages outlined in the foregoing (e.g., terminals being unduly prevented from entering a network).

One objective, therefore, relates to the problem of devising an improved network entry procedure that complies in a fully satisfactory manner to the otherwise conflicting requirements outlined in the foregoing.

Accordingly, one aspect relates to a method of performing a network entry of a terminal to a wireless network including a base station, wherein the terminal has a maximum power capability. At least one attempt is performed by the terminal to establish communication with the base station with a power level within a terminal admitted power range. The terminal admitted power range extends up to the maximum power capability of the terminal. In the absence of a response from the base station, one or more repeated attempts are performed with power levels gradually increased over the initial power level within a terminal admitted power range. The admitted power range extends up to the maximum power capability of the terminal.

Another aspect relates to a corresponding computer program product, loadable in the memory of at least one computer and including software code portions for performing the steps of the method of the invention when the product is run on a computer.

As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the arrangement described herein is thus a terminal for connection to a base station in a wireless network which, during the entry procedure to the network, is allowed to possibly increase its power to reach its maximum power (i.e., its maximum power capability) in the absence of an answer from the base station during initial ranging. Allowing the terminal to reach its maximum capability in the absence of an answer from the base station would result in the cell radius (especially for fixed system) being enlarged, without any upper bound as given e.g. by the formula for $P_{TX\_IR\_MAX}$ given in the foregoing.

Stated otherwise, the approach underlying the current standards for network entry can be summarized as follows: "If, during initialization, power is increased to the maximum value, without a response from the base station (BS), it (i.e., the terminal) shall wrap back to the minimum."

As opposed thereto, the approach underlying the preferred embodiment of the arrangement described herein can be summarized as follows: "If, during initialization, power is increased to the maximum value (e.g., $P_{TX\_IR\_MAX}$ for TDD)— or to its maximum capability (e.g., for FDD)—without a response from the base station (BS) it shall wrap back to the minimum."

The arrangement described herein thus enables different systems to perform at their best, according to their specific capabilities. In fact, if the terminal does not receive any response from the base station, a substantial likelihood exists that either a collision has occurred or the signal is not good enough. Consequently, increasing the terminal power (if possible—i.e., over a terminal admitted power range which extends up to the maximum power capability of the terminal) is a thoroughly sensible approach.

BRIEF DESCRIPTION OF THE SEVERAL VIEWS OF THE DRAWINGS

The invention will now be described, by way of example only, with reference to the enclosed figures of drawing, wherein.

DETAILED DESCRIPTION OF THE INVENTION

Figure 1:
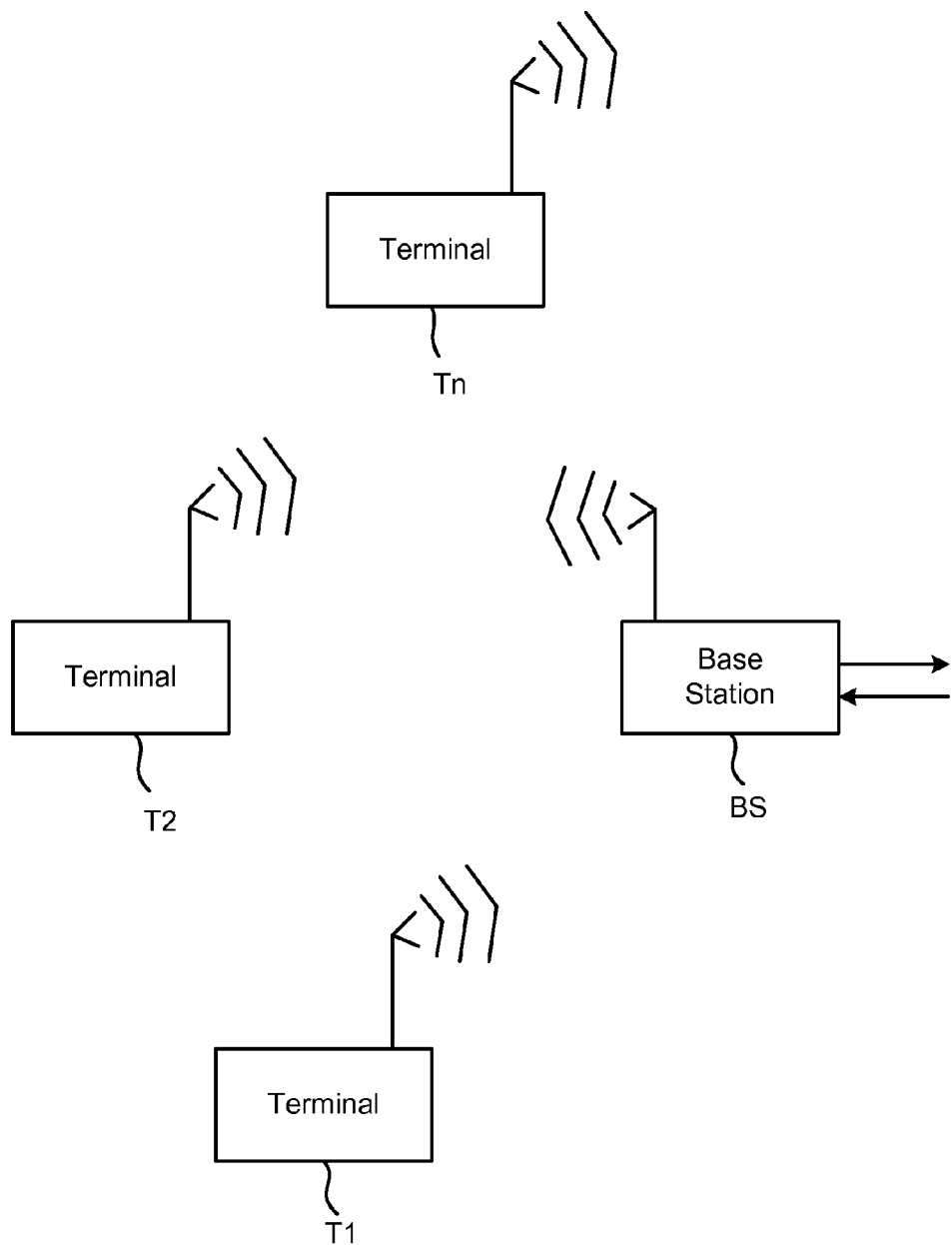
FIG. 1 is a block diagram of a wireless communication network adapted to include the arrangement described herein.

In the block diagram of FIG. 1, reference signs T1, T2, . . . , Tn designate a set of terminals including any number (including one) of terminals to be connected to form a wireless network including a base station BS. The terminals may be of any known type, mobile or fixed, and be identical or different from each other. While designated as a base station (BS) in connection with its operation as described in the following, the base station may be in itself or include a network terminal (mobile or fixed) and/or act as an access point (AP) for the network illustrated in FIG. 1.

Mobile communication networks (e.g., 3G mobile networks and beyond) and Wireless Local Area Networks (W-LANS), such as WiMAX, are exemplary of a wireless network as illustrated in FIG. 1.

Access of terminals T1, T2, . . . , Tn to the network involves a Network Entry procedure (performed according to principles that are known per se and do not require to be explained in detail herein). During the entry procedure, the terminal (terminal T1 is hereinafter referred to as a non limiting example) seeks to establish communication with the base station BS until it receives a confirmation response from the base station BS. The terminal T1 starts from an initial power level, and in case no response is received from the base station BS, the terminal T1 gradually increases its transmission power up to a maximum value, and possibly "wraps back" to the initial value, restarting the procedure from the beginning, if no response is received from the base station BS.

Figure 2:
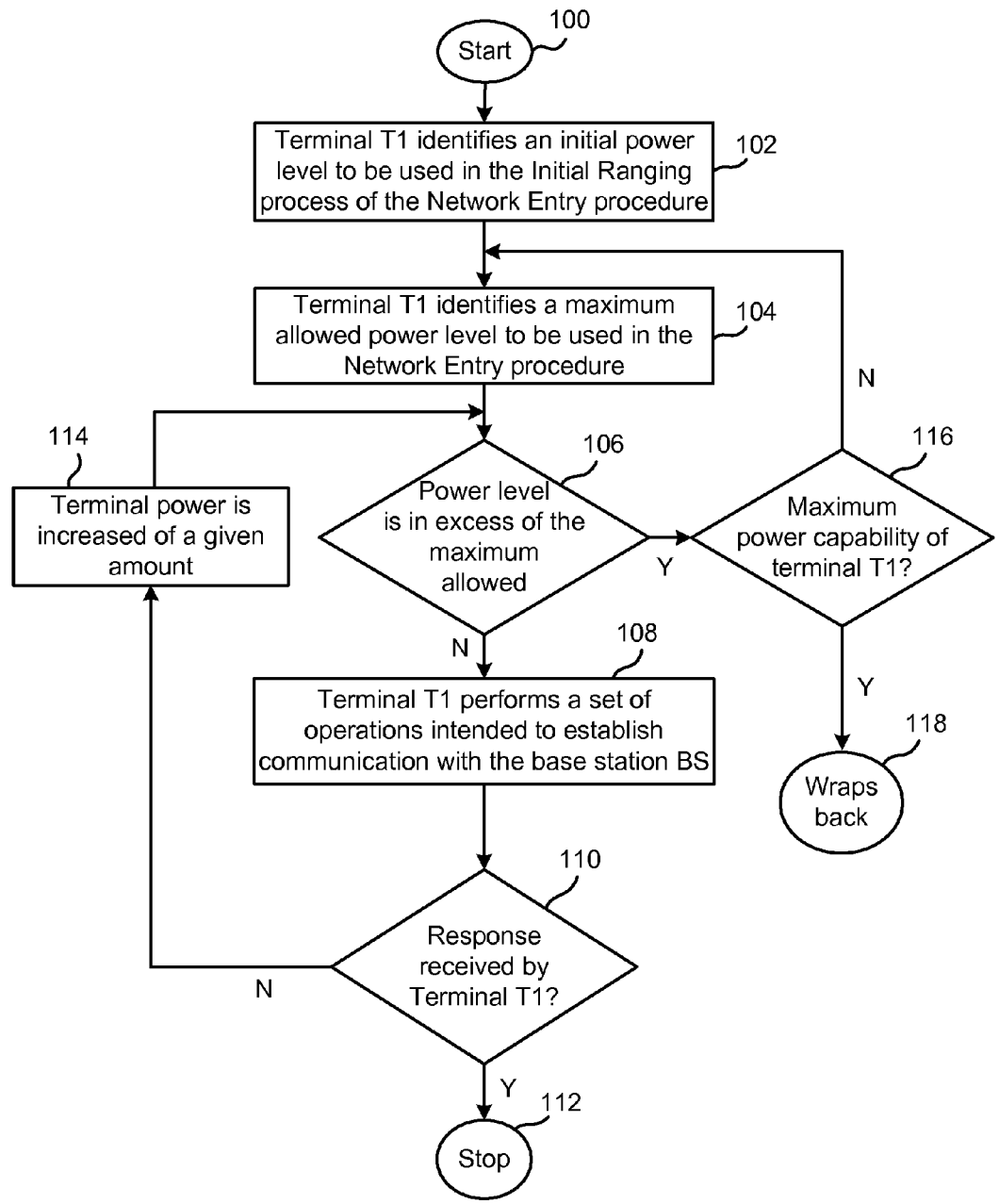
FIGS. 2 and 3 are two flow charts exemplary of different types of operation of the arrangement described herein.

Referring to the flow chart of FIG. 2, after a start step 100, in a step 102, the terminal T1 identifies (in manner known per se, e.g., by reading it in a table of configuration values, or by calculating it on the basis of a formula of the type reproduced in the foregoing) an initial power level to be used in the Initial Ranging process of the Network Entry procedure.

In a step 104, the terminal identifies (again in a manner known per se, e.g., by reading it in a table of configuration values or by calculating it according to a given formula) a maximum allowed power level (e.g. $P_{TX\_IR\_MAX}$) to be used in the Network Entry procedure.

In a control step 106, a check is made as to whether the power level currently used by the terminal T1 is not in excess of the maximum level allowed and, if that is the case, the terminal T1 performs a set of operations (which are known per se, e.g., from the standards cited in the introductory portion of this description) intended to establish communication with the base station BS.

If these operations (collectively represented by the block 108 in the diagram of FIG. 2) are successful, the base station BS sends a response to the terminal T1. Whether such a response is received is checked in a step 110, and in the positive (i.e., a response is received from the base station BS) the Network Entry procedure is completed (by possibly performing other operations not illustrated, but of a known type) as indicated by a stop step 112.

If the step 110 yields a negative outcome (i.e., no response is received from the base station BS), in a step 114, the terminal power is increased by a given amount (set according to known criteria) and the attempt to obtain a response from the base station BS is repeated using an increased power level.

The sequence of steps described is repeated until either the step 110 yields a positive outcome (i.e., a response is received from the base station BS), or the step 106 indicates that no further increases of the power level are possible without exceeding the maximum level $P_{TX\_IR\_MAX}$ set in the step 104.

Contrary to conventional arrangements (which at this point would "wrap back" to the initial value minimum and possibly activate the back-off procedure after a given number of repeated attempts without communication being established), the arrangement described evolves to the step 104 (via a step 116 to be described in the following) by re-setting the maximum level admitted.

Specifically, to the upper limit previously set (e.g., $P_{TX\_IR\_MAX}$) a level $P_{MAX\_CAP}$ is substituted corresponding to the maximum power capability of the terminal T1. In that way, the terminal admitted power range, that is the range admitted for power increases (see step 114) by the terminal, is extended upwardly to the maximum power capability of the terminal T1.

At this point, step 106 again permits the steps 108 to 114 to be repeated by using power values that are increased beyond the maximum level previously set (e.g., $P_{TX\_IR\_MAX}$) in order to attempt to establish communication with the base station BS and obtain a response from it by being able to exploit the maximum power capability of the terminal T1.

In fact, in the arrangement described herein, the terminal T1 "wraps back" (step 118) to the initial value (and possibly activates the back-off procedure described in the foregoing and/or aborts the Network Entry procedure with the specified channel after a given number of repeated attempts without communication being established) only after the power is gradually increased (via steps 114)—without having a response from the base station BS—up to the maximum power capability $P_{MAX\_CAP}$ of the terminal, namely up to the point where no further power increases are possible. In that case the step 106 indicates that further increases exceed the maximum power capability of the terminal T1 and the step 116 indicates that the maximum level has been already been reset to $P_{MAX\_CAP}$, i.e., the maximum power capability of the terminal T1.

The embodiment to which the flow chart of FIG. 2 refers retains the advantages inherent in setting a maximum level for the power used by a terminal in performing Network Entry (i.e., avoiding that a high transmission power, likely to "spoil" signals from other terminals in the network, is unnecessarily used), while also avoiding that a terminal may be finally excluded from entry to a network due to being prevented from exploiting its full power capability.

The specific embodiment illustrated in the flow chart of FIG. 2 provides for "wrapping back" to the initial level if no responses are received—after—the terminal power has been allowed to increase beyond the upper limit $P_{TX\_IR\_MAX}$ originally set towards the level $P_{MAX\_CAP}$ corresponding to the maximum power capability of the terminal T1.

Those of skill in the art will appreciate that, in a presently less preferred variant, "wrapping back" to the initial minimum power level may take place (also)—before—the terminal power is allowed to increase beyond the upper limit $P_{TX\_IR\_MAX}$ originally set towards the maximum power capability $P_{MAX\_CAP}$. Stated otherwise, in such a case, the terminal T1 will repeatedly perform "power increase and wrap back" cycles with $P_{TX\_IR\_MAX}$ as the upper power limit, and then, in the absence of any response from the base station BS, perform one or more "power increase and wrap back" cycles within a terminal admitted power range extended upward to the maximum power capability of the terminal T1 $P_{MAX\_CAP}$. In such a case, the Network Entry procedure is repeatedly attempted with the limitation of the output power to $P_{TX\_IR\_MAX}$ before removing this limitation to fully exploit the maximum power capability $P_{MAX\_CAP}$ of the terminal T1.

The flow chart of FIG. 3 (where the same reference numerals have been used to designate steps/operations identical or equivalent to those already described in connection with the flowchart of FIG. 2) refers to an alternative embodiment where the "threshold" level used in the step 106 is directly set in the step 104 to the value $P_{MAX\_CAP}$ corresponding to the maximum power capability of the terminal T1 following a configuration step 120. Such configuration may take place already during the manufacture/installation of the terminal T1 in those cases (e.g., a FDD system with asymmetric "downlink" and "uplink" channels) where a successful Network Entry procedure is expected to almost invariably require exploiting the maximum power capability of the terminal T1.

Figure 3:
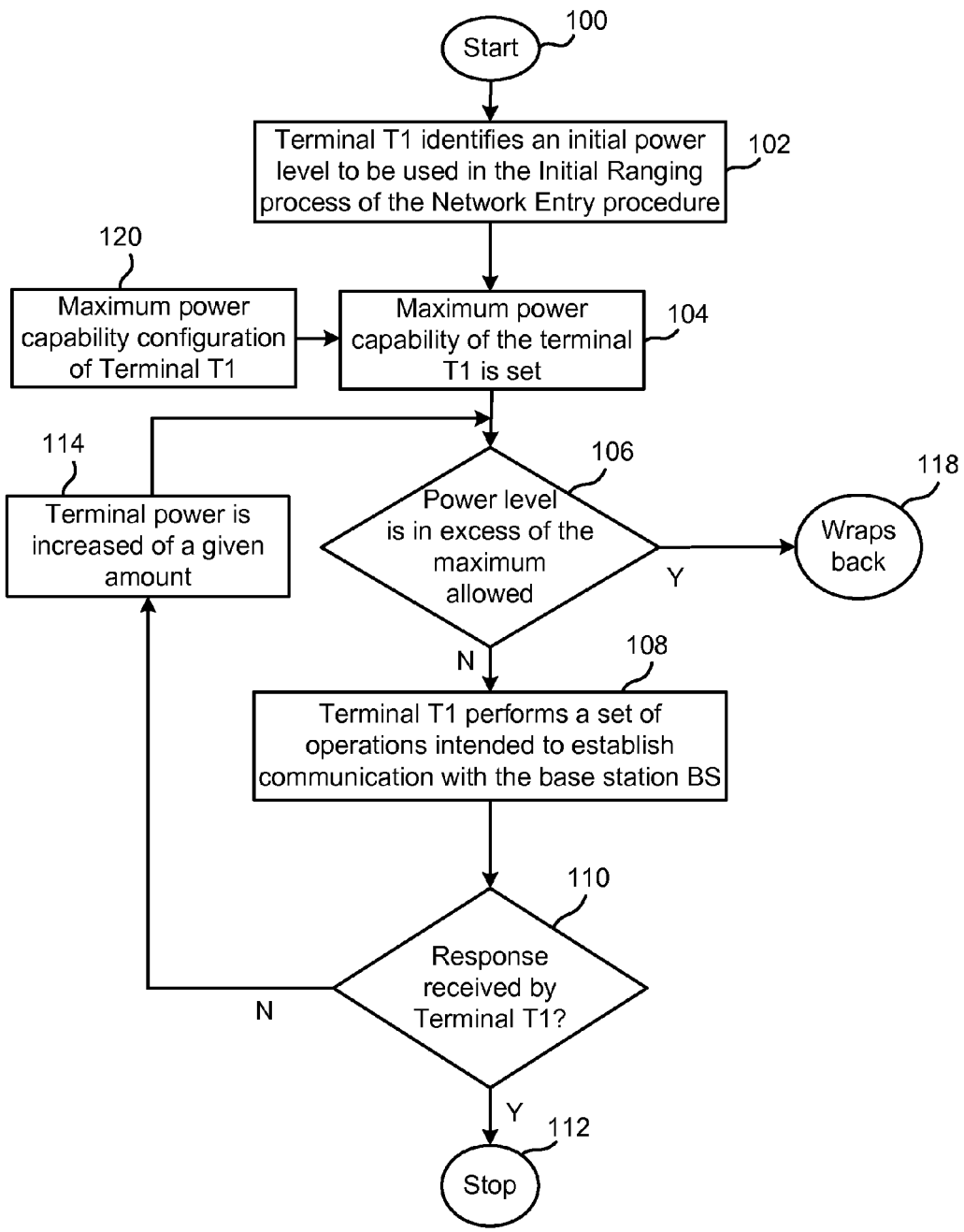

Of course, still other alternative embodiments are possible, including, but not limited to, embodiments that incorporate the features of both embodiments illustrated in the flow charts of FIGS. 2 and 3, i.e., embodiments that are selectively configurable to attempt Network Entry by first limiting the output power and then exploiting the full power capability or to attempt from the very beginning Network Entry without any limitation on the output power, or embodiments where Network Entry is attempted from the very beginning by using the full power capability of the terminal.

Consequently, without prejudice to the underlying principles of the invention, the details and the embodiments may vary, even appreciably, with reference to what has been described by way of example only, without departing from the scope of the invention as defined by the annexed claims.

What is claimed is:

1. A method of performing network entry of a terminal to a wireless network including a base station, said terminal having a maximum power capability, the method comprising:
   performing at least one attempt by said terminal to establish communication with said base station with an initial power level within a terminal admitted power range, wherein said terminal admitted power range extends up to said maximum power capability of the terminal;
   in the absence of a response from said base station, performing at least one repeated attempt by said terminal to establish communication with said base station with a power level increased over said initial power level within said terminal admitted power range; and
   in the absence of a response from said base station, performing at least one further attempt by said terminal to establish communication with said base station with a power level wrapped back to said initial power level.

2. The method of claim 1, wherein the performing at least one repeated attempt comprises performing at least one repeated attempt by said terminal to establish communication with said base station with a power level increased up to said maximum power capability of the terminal.

3. The method of claim 1, further comprising performing said at least one further attempt with a power level wrapped back to said initial power level performed by said terminal after said at least one repeated attempt by said terminal to establish communication with said base station with a power level increased up to said maximum power capability of the terminal.

4. The method of claim 1, further comprising extending said terminal admitted power range up to said maximum power capability of the terminal as a step of terminal configuration.

5. A method of performing network entry of a terminal to a wireless network including a base station, said terminal having a maximum power capability, the method comprising:
   performing at least one attempt by said terminal to establish communication with said base station with an initial power level within a terminal admitted power range, wherein said terminal admitted power range extends up to said maximum power capability of the terminal;
   in the absence of a response from said base station, performing at least one repeated attempt by said terminal to establish communication with said base station with a power level increased over said initial power level within said terminal admitted power range;
   setting an initial upper limit for said terminal admitted power range;
   performing said at least one repeated attempt by said terminal to establish communication with said base station with a power level increased over said initial power level within said terminal admitted power range limited by said initial upper limit;

in the absence of a response from said base station, extending said terminal admitted power range beyond said initial upper limit up to said maximum power capability of the terminal; and performing at least another repeated attempt by said terminal to establish communication with said base station with a power level increased in excess of said initial upper limit.

6. The method of claim 5, further comprising extending said terminal admitted power range up to said maximum power capability of the terminal as a step of terminal configuration.

7. A non-transitory computer-readable medium storing computer-executable instructions that instruct a computer to perform steps of a method of performing network entry of a terminal to a wireless network including a base station, said terminal having a maximum power capability, the steps comprising:

performing at least one attempt by said terminal to establish communication with said base station with an initial power level within a terminal admitted power range, wherein said terminal admitted power range extends up to said maximum power capability of the terminal;

in the absence of a response from said base station, performing at least one repeated attempt by said terminal to establish communication with said base station with a power level increased over said initial power level within said terminal admitted power range; and in the absence of a response from said base station, performing at least one further attempt by said terminal to establish communication with said base station with a power level wrapped back to said initial power level.

8. The non-transitory computer-readable medium of claim 7 wherein the computer-executable instructions further instruct the computer to perform said at least one further attempt with a power level wrapped back to said initial power level performed by said terminal after said at least one repeated attempt by said terminal to establish communication with said base station with a power level increased up to said maximum power capability of the terminal.

9. A method of performing network entry of a terminal to a wireless network including a base station, said terminal having a maximum power capability, the method comprising:

performing at least one attempt by said terminal to establish communication with said base station with an initial power level within a terminal admitted power range, wherein said terminal admitted power range extends up to said maximum power capability of the terminal;

in the absence of a response from said base station, performing at least one repeated attempt by said terminal to establish communication with said base station with a power level increased over said initial power level within said terminal admitted power range; and in the absence of a response from said base station, performing at least one further attempt by said terminal to establish communication with said base station with a power level wrapped back to said initial power level.

10. The method of claim 9, further comprising extending said terminal admitted power range up to said maximum power capability of the terminal as a step of terminal configuration.

11. A method of performing network entry of a terminal to a wireless network including a base station, said terminal having a maximum power capability, the steps comprising:

performing at least one first attempt by said terminal to establish network entry with said base station using a power level that increases on each first attempt between an initial power level and an initial maximum power level admitted for the terminal; and in the absence of a response from said base station, performing at least one second attempt by said terminal to establish network entry with said base station with a power level that increases on each second attempt up to a maximum power capability for the terminal, wherein the maximum power capability for the terminal is greater than the initial maximum power level admitted for the terminal.

12. The method of claim 11 and further comprising:

in the absence of a response from the base station in response to either said at least one first attempt and said at least on second attempt, wrapping back to perform at least one third attempt to establish network entry by said terminal to establish network entry with said base station using a power level that increases on each third attempt between the initial power level and the initial maximum power level admitted for the terminal.

13. The method of claim 11 and further comprising, prior to the at least one second attempt, increasing a maximum power setting wherein, for the at least one second attempt, maximum power capability for the terminal is greater than the initial maximum power level admitted for the terminal.

14. The method of claim 11 and further comprising:

in the absence of a response from the base station from either said at least one first attempt and said at least on second attempt, performing the following:

performing a backoff procedure; and wrapping back to perform at least one third attempt by said terminal to establish network entry with said base station using a power level that increases on each third attempt between the initial power level and the initial maximum power level admitted for the terminal.

15. A non-transitory computer-readable medium storing computer-executable instructions that instruct a computer to perform steps of a method of performing network entry of a terminal to a wireless network including a base station, said terminal having a maximum power capability, the steps comprising:

performing at least one first attempt by said terminal to establish network entry with said base station using a power level that increases on each first attempt between an initial power level and an initial maximum power level admitted for the terminal; and in the absence of a response from said base station, performing at least one second attempt by said terminal to establish network entry with said base station with a power level that increases on each second attempt up to a maximum power capability for the terminal, wherein the maximum power capability for the terminal is greater than the initial maximum power level admitted for the terminal.

16. The non-transitory computer-readable medium of claim 15 wherein the computer-executable instructions further instruct the computer to perform the steps of:

in the absence of a response from the base station in response to either said at least one first attempt and said at least on second attempt, wrapping back to perform at least one third attempt to establish network entry by said terminal to establish network entry with said base station using a power level that increases on each third attempt between the initial power level and the initial maximum power level admitted for the terminal.

17. The non-transitory computer-readable medium of claim 15 wherein the computer-executable instructions further instruct the computer to perform the steps of:
  in the absence of a response from the base station from either said at least one first attempt and said at least on second attempt, performing the following:
   performing a backoff procedure; and
   wrapping back to perform at least one third attempt by said terminal to establish network entry with said base station using a power level that increases on each third attempt between the initial power level and the initial maximum power level admitted for the terminal.

* * * * *

UNITED STATES PATENT AND TRADEMARK OFFICE
CERTIFICATE OF CORRECTION

PATENT NO.        : 8,023,986 B2                                   Page 1 of 1
APPLICATION NO.   : 12/008242
DATED             : September 20, 2011
INVENTOR(S)       : Giulio Cavalli et al.

It is certified that error appears in the above-identified patent and that said Letters Patent is hereby corrected as shown below:

In column 8, line 17, in claim 12, delete "on second" and insert -- one second --, therefor.

In column 8, line 30, in claim 14, delete "on" and insert -- one --, therefor.

In column 8, line 62, in claim 16, delete "on second" and insert -- one second --, therefor.

In column 9, line 5, in claim 17, delete "on" and insert -- one --, therefor.

Signed and Sealed this
Fourth Day of December, 2012

David J. Kappos
*Director of the United States Patent and Trademark Office*